Nov. 16, 1937.    M. DE SIMO ET AL    2,099,513
HYDROCARBON OIL MANUFACTURE
Filed Sept. 3, 1935
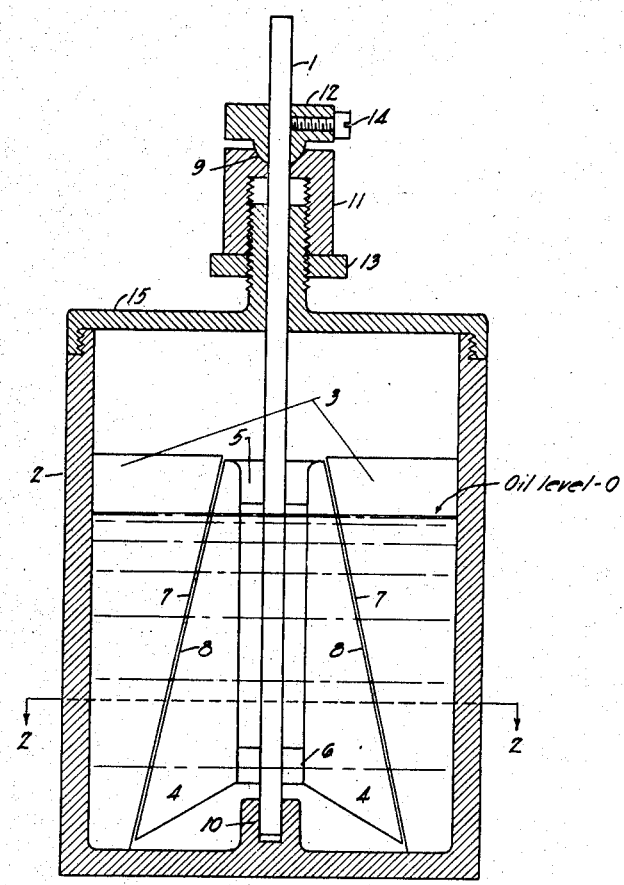
Fig. I.
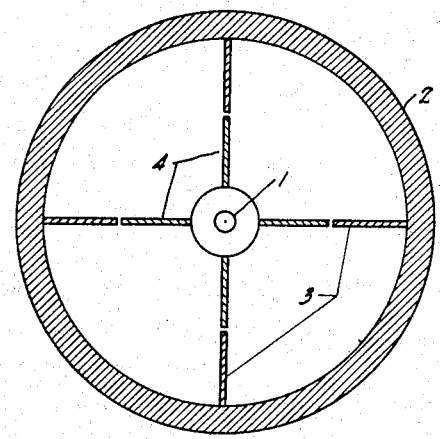
Fig. II.
Inventors:
Martin De Simo
Frederick B. Hilmer
By their Attorney:

Patented Nov. 16, 1937

2,099,513

UNITED STATES PATENT OFFICE 2,099,513

HYDROCARBON OIL MANUFACTURE

Martin de Simó and Frederick B. Hilmer, Berkeley, Calif., assignors to Shell Development Company, San Francisco, Calif., a corporation of Delaware Application September 3, 1935, Serial No. 38,991

6 Claims. (Cl. 196—13)

This invention relates to methods for producing mixtures of high molecular weight hydrocarbon polymers of relatively uniform molecular weight which are colloidally dispersible in hydrocarbon liquids of the type of light and heavy lubricating oils, Diesel fuels, etc. In particular it deals with a method of separating crude mixtures of said polymers into fractions consisting of polymers having uniform molecular weights by means of selective solvents.

In its more limited aspect it is the purpose of this invention to produce lubricating oils of high stability and greatly improved viscosity index by blending mineral oils with selected fractions of hydrocarbon polymers chosen from polymerization products of unsaturated hydrocarbons capable of forming polymeric homologous series.

Hydrocarbon polymers such as polymerized styrene, hydrogenated polymerized styrene, polymerized indene, hydrogenated rubber, hydrogenated polymerized diolefines, polymers produced from propylene or beta iso-olefines under the influence of polymerizing catalysts of the type of boron fluoride, or hydrogenated products of these polymers are dispersible in hydrocarbon oils, the relatively small polymers being truly soluble, while the larger ones are colloidally dispersible. Mixtures of these polymers have been used successfully in the past for improving the viscosity index of lubricating oils.

The effect of forming colloids by adding hydrocarbon polymers to lubricating oils on the viscosity and viscosity index of the lubricating oils has been discussed in the literature and it is known that the addition of hydrocarbon polymers raises both the viscosity and viscosity index, the magnitude of the effect depending largely on the concentration and size of the colloidal particles.

It has been recognized in the past, that polymers having average molecular weights of below 1000 cause relatively little improvement in the viscosity index, and polymers of average molecular weights as high as 5000 have been employed to obtain the desired effect. We have discovered that, in addition to the greater effect of large polymers over smaller ones on the viscosity index, the large polymers raise the viscosity less for a given improvement of the index. A large increase in viscosity resulting from the addition of polymers is undesirable. High volatility is known to affect adversely oil consumption in internal combustion engines, and therefore, it is preferable that the improvement in viscosity index be obtained at the cost of smallest possible increase in viscosity. Furthermore, there exists an excess of very viscous lubricants over thinner ones, and greatly raising the viscosity of existing lubricating oils is, therefore, very undesirable.

Crude polymers, such as polystyrenes or those produced by polymerization of iso-olefines with catalysts of the type of boron fluoride normally consist of mixtures of compounds having molecular weights varying from well below 1000 to an unknown upper limit, which may be of the order of 200,000. The molecular weights of the largest components have so far not been accurately established because of limitations of the available methods for the determination of molecular weights. Molecular weights of polymers hereinafter reported, were obtained by the cryoscopic method involving the use of benzol and must, therefore, be considered within the limits of accuracy of this method.

We have found that, in order to effect the greatest improvement in viscosity characteristics of lubricating oil, it is advantageous to eliminate from crude polymers the components which have molecular weights below at least about 1500, and to utilize for blending with lubricating oils compounds having molecular weights preferably above 10,000.

For the purpose of illustrating the effect of molecular weights on viscosity and viscosity index the following illustrative example is given:

By blending a 200 California pale oil with polyisobutylene of various molecular weights several blends were made having viscosity indexes of approximately 110 as determined from their viscosities at 100° F. and 210° F. The data are given in Table I.

TABLE I

Effect of polymers on viscosity characteristics of a hydrocarbon oil

| Percent 200 pale oil | Percent polymers | Average mol. wt. of polymers | Dean & Davis V. I. | S. U. vis. at 100° F. | S. U. vis. at 210° F. |
|---|---|---|---|---|---|
| 100 | | | 35 | 217 | 44.3 |
| 80 | 20 | 2,560 | 108 | 2,041 | 152 |
| 90 | 10 | 6,000 | 110 | 1,310 | 115.0 |
| 98 | 2 | *20,000 | 111 | 584 | 73 |
| 99 | 1 | *30,000 | 110 | 501 | 67 |

*Estimated.

The above figures clearly show the beneficial effects obtained by blending polymers of very high molecular weights with lubricating oils. With increasing molecular weights a smaller quantity of polymers is capable of raising the viscosity index to a predetermined value at a smaller loss of fluidity.

While high molecular weight polymers are decidedly advantageous with respect to improving the V. I., we have found that for reasons of stability, polymers of excessively high molecular weights which appear to be of the order of 150,000, should be eliminated. Whereas the thermal stability of even the largest polymers may be such that heating at 250° C. for a period of 10 and up to 100 hours, has little effect on them, the mechanical stability of excessively large molecules may be quite poor. Thus when lubricating oils containing such very large polymers are worked even at room temperature, i. e., are agitated by stirrers, pumps, or forced through bearings, etc., they have a tendency to break down with a resulting decrease in both the viscosity and viscosity index. It is therefore desirable to eliminate some of the highest polymers, which are usually present in the type of polymers produced, for instance, from iso-olefines with boron fluoride. Since the molecular size of these unstable excessively large polymers could not be accurately determined, we have resorted to an indirect method of establishing their presence by a test comprising working a solution of the polymers dissolved in a stable oil in a testing apparatus for a certain length of time.

The test which hereinafter for the purpose of definition and identification in the specification as well as in the claims, is called the shear-viscosity breaking test, and the apparatus required to carry out the test, are described exactly and in detail as follows.

A test solution is prepared by dissolving 2% of the polymers in a stable, well refined California pale oil having a Saybolt Universal viscosity at 100° F. of 200 seconds and a viscosity index of about 35. 200 milliliters of this solution are placed into an apparatus which consists essentially of a closed cup, of about 300 milliliters capacity and contains four stationary and four rotatable blades. The rotatable blades are adjustable, so that when they rotate, their edges barely clear the edges of the stationary blades, thereby effecting a shearing action on any medium caught between the two sets of blades.

In carrying out the shear viscosity breaking test, the rotatable blades rotate at 5000 R. P. M. for 4 hours. The 200 milliliters of oil are thus exposed to 20,000 shears per minute. We have found that if the above 2% solution of polymers loses not more than 5% viscosity as measured in Saybolt Universal seconds, the polymers are substantially stable and satisfactory for use in gears and engines and are considered to have passed the test. Conversely, if the test solution loses more than 5% viscosity, the polymers being insufficiently stable and unsuitable for use in engines and gears, are pronounced to have failed in the shear-viscosity breaking test.

To more fully explain the test apparatus and its operation, a reference is now had to the drawing. Figure 1 represents a cross-sectional elevation view of said apparatus and Figure 2 is a cross-sectional view taken on line 2—2 of Figure 1.

In Figure 1, vertical rotatable shaft 1 is disposed in the axis of cylindrical cup 2. The dimensions of the cup 2 are such that 200 milliliters of liquid fill the cup about ⅔ full to level 0. The ratio of inside diameter to inside height of the cup is approximately 2 to 3.

Stationary blades 3, radially arranged and firmly attached to the inside of cup 2, or to a removable support not shown, fitting snugly into cup 2, extend from the bottom to about ¾ of the height of the cup. At their upper end they reach farther toward the axis of the cup than at their lower end. Another set of blades 4 is attached to shaft 1 by means of brackets 5 and 6. Opposing edges 7 and 8 of the two sets of blades 3 and 4 are straight and so designed, that when the shaft rotates, they barely clear each other along their entire length.

The shaft 1 rests in top bearing 9 and bottom bearing 10. Top bearing 9 can be adjusted vertically with relation to cup 2 by means of adjusting screw 11. By turning screw 11 one way or another the two sets of blades can be made to almost but not quite touch each other along the full length of their respective edges 7 and 8. To obtain a good shearing action the clearance between the edges 7 and 8 should be of the order of .1 millimeter.

The shaft 1 is held by collar support 12 with the aid of set screw 14, the collar support 12 in turn resting in bearing 9. Lock nut 13 secures adjusting nut 11 in a once chosen position.

The top 15 of cup 2 is removable to permit easy filling and emptying of the cup.

In Figure 2, the inside of cup 2 is shown to carry the four radially arranged stationary blades 3, the latter barely clearing the rotatable blades 4 attached to shaft 1 by brackets not shown.

The shaft is driven by a motor, not shown, directly or by way of a transmission, at a constant speed of 5,000 R. P. M.

Shear viscosity breaking tests are generally started at room temperature. In the course of the test the oil warms up considerably due to the shearing and churning action of the blades. Since the stability of the polymers is normally little affected by temperatures below 200° C., no attempt is made to closely control the temperature of the test.

Fractionation of polymers has been attempted in the past by means of distillation under extremely high vacua of the order of less than .1 mm. mercury pressure. Polymers of molecular weights up to 700 have been distilled, but further fractionation by this method proved to be impossible without cracking the polymers.

We now have invented a very useful method of fractional separation which consists of treating the crude polymers, or a strong solution thereof, with selective solvents. Selectivity of solvents toward analogous polymers of high molecular weights is generally manifested by the fractions of low molecular weight being more soluble in the solvent than those having high molecular weights, so that when a selective solvent, alone or in the presence of other solvents, is brought into intimate contact with a mixture of polymers two phases or layers separate, one being liquid and consisting predominantly of solvent and lower polymers, and the other being liquid or solid and consisting essentially of higher polymers.

The layers are separated and may be subjected separately to further treatment, if desired. The one-step treatment may be sufficient, if a separation into two portions only is desired. However, frequently we prefer to repeat the treatment with one or more other selective solvents, or with the same selective solvent in different proportions, and/or at different temperatures, to effect further fractionation. Thus the undissolved residue may, for instance, be treated with a second solvent of increased solvent power to dissolve a fraction of polymers of an average molecular weight which is higher than that of the previously removed fraction.

Since the polymers are difficult to handle because of their rubber-like, sticky texture, we prefer to carry out the fractionation by a procedure which consists of, first, dissolving the raw polymers in a suitable non-selective solvent, such as benzene, hexane, naphtha, carbon tetrachloride, etc., which is miscible with the selective solvents used later, and then treating the solution with a sufficient amount of a selective solvent to effect the precipitation of a fraction which consists substantially of higher polymers, as described. The two phases are separated, for example, by decantation, and the supernatant solution, from which part of the solvents may be removed by distillation if desired, is treated with further quantities of the same selective solvent or a selective solvent of greater precipitating power, to cause further precipitation of intermediate polymers. The resulting layers are again separated, and the procedure may be repeated.

Among the selective solvents suitable for our purpose may be mentioned oxyorganic substances, substituted or not, which are liquid at treating temperatures, as well as amino- and/or cyano-organic liquid compounds. Out of this large group a class of compounds was found to be particularly useful, which consists of normally liquid oxy-hydrocarbons, possessing 20 or less carbon atoms, from 2 to 10 carbon atoms per atom of oxygen and stable under the conditions of the treatment.

Following are some typical representatives of the class of most useful solvents:

Mono-alcohols of 2 to 10 carbon atoms, aliphatic or cyclic, primary, secondary or tertiary, having not more than one olefinic bond; for instance, ethyl alcohol, propyl alcohol, isopropyl alcohol, primary, secondary and tertiary butyl alcohols, amyl to decyl alcohols, benzyl alcohol, phenyl methyl carbinol, phenyl dimethyl carbinol, vinyl alcohol, allyl alcohol, crotonyl alcohol, methyl allyl alcohol, furfural alcohol, etc.

Poly-alcohols of the type of glycols, glycerines, etc., of 4 to 20 carbon atoms, such as dimethyl glycol, pinacone, pentaglycerin, glycerin propyl ether, etc.

Aldehydes of 2 to 10 carbon atoms, aliphatic or cyclic, having not more than one olefinic bond; for instance acetyl aldehyde, butyl aldehyde, isobutyl-aldehyde, croton aldehyde, benzaldehyde, furfural, etc.

Ketones of 3 to 10 carbon atoms, symmetric or asymmetric, aliphatic or cyclic, having not more than one olefinic bond; for example acetone, isobutyl-ethyl ketone, vinyl-butyl ketone, phenylmethyl ketone, diacetyl, acetyl-acetone, mesityl-oxide, etc.

Condensation products of alcohols, aldehydes and/or ketones, possessing from 4 to 20 carbon atoms, such as ethyl acetal, butyl acetal, di-acetone, etc.

Ethers of 4 to 20 carbon atoms, symmetric or asymmetric, aliphatic or cyclic having not more than one olefinic bond; for example di-ethyl ether, iso-propyl-ethyl ether, vinyl-butyl ether, methyl-phenyl oxide, ethylene glycol ethyl ether, diethylene dioxide, tetramethylene oxide, furfuran, glycerin propyl ether, oxetone, etc.

Aliphatic mono-carboxy acids of 4 to 20 carbon atoms, straight or branch chained, having not more than one olefinic bond; for instance n-heptylic acid, methyl-diethyl acetic acid, oleic acid, etc.

Esters of 4 to 20 carbon atoms of alcohols and aliphatic mono-carboxy acids; for instance, isobutyl acetate, allyl-butyrate, methyl oleate, etc.

Phenolic compounds, such as phenol, cresols, xylenols.

While solvents falling within the above class of most useful compounds are always applicable to our process many other compounds outside the specified range can be used under limited conditions. For instance, methyl alcohol, acetic acid, formaldehyde and others possessing less than 2 carbon atoms per atom of oxygen, when used in relatively small proportions may effect the fractional precipitation of polymers from a solution thereof. However, they cannot be used advantageously to dissolve at room temperature fractions of polymers from a body of polymers in the absence of a more powerful solvent. Compounds which fall within the general classification, but which are ruled out because they are unstable under conditions of the treatment or during their removal, or because their melting points are too high and/or their boiling points are too high or too low, or because of other reasons, may find a limited application under conditions which do not interfere with their particular limitations.

When fractionally precipitating polymers with a number of selective solvents in the manner described, we prefer to carry out this precipitation with a series of solvents of close chemical relation, such as of the same chemical types, for within such a related series the precipitating power changes strictly with the oxygen content of its members, and a well regulated orderly fractionation can thus be achieved, provided the temperature is carefully controlled.

Following are specific examples of such series whose members are used as precipitating agents in the order indicated:

Ketone series: ethyl-butyl ketone, ethyl-propyl ketone, ethyl-ethyl ketone, ethyl-methyl ketone, and acetone. Ether series: propyl-butyl ether, di-propyl ether, ethyl-propyl ether, and di-ethyl ether. Alcohol series: amyl alcohol, secondary butyl alcohol, iso-propyl alcohol and ethyl alcohol.

Typical results which can be achieved with such series are shown in the following illustrative examples, in which polymers obtained by the polymerization of iso-butylene under the influence of boron fluoride at low temperatures, were fractionated at 20° C. in accordance with our invention. Two parts of highly viscous polymers were dissolved in about 3 parts of benzol. A solution resulted, to which about 5 parts of selective solvent were added to effect precipitation. By using three separate solvents in three successive steps and separating the resulting precipitate after each step, the original polymer mixture was separated into four fractions, as shown in Table II.

TABLE II

*Fractional precipitation of polymers with alcohols at 20° C. from a solution in benzol*

| Solvent | Average mol. wt. of polymers |
| --- | --- |
| Amyl alcohol | Approx. 11,000 |
| Secondary butyl alcohol | Approx. 4,000 |
| Iso-propyl alcohol | Approx. 1,660 |
| Recovered solute | Approx. 950 |

A similar procedure with a series of aliphatic ketones resulted in producing five fractions listed in Table III.

TABLE III

Fractional precipitation of polymers with ketones at 20° C. from a solution in benzol

| Solvent | Weight of precipitated polymers | Average molecular weight of precipitated polymers | Consistency of precipitate after drying |
|---|---|---|---|
| Methyl isobutyl ketone | 71 | Approx. 15,000 | Tough elastic non-sticky. |
| Methyl-propyl ketone | 10 | Approx. 3,700 | Soft sticky. |
| Methyl-ethyl ketone | 7 | Approx. 2,080 | Very soft sticky. |
| Acetone | 6 | Approx. 1,440 | Very sticky semifluid. |
| Recovered solute | 3 | Approx. 560 | Viscous sticky oil. |

The quantities of the selective solvent to be added may be varied depending upon the desired type of polymer fractions. In ordinary fractional separation of polymer mixtures into a series of fractions with a series of selective solvents, we have found that a ratio of 2 parts of polymers to about 5 parts of selective solvent forms a convenient working combination. However, this ratio need not always be adhered to, since in some cases depending on the conditions of temperature, nature of selective solvent, and nature and quantity of non-selective solvent, ratios widely different from the above may give equally satisfactory results.

If fractionation is carried out with a single selective solvent again the polymers are preferably first dissolved in a non-selective solvent. The resulting solution is treated repeatedly with relatively small quantities of selective solvent and the precipitate formed after each addition is removed.

A selective solvent in definitely limited quantities may be required in the special case in which a very small fraction consisting of the very largest mechanically unstable polymers is to be removed. For example we have found that normally for this purpose the addition of about 5 to 10% of ethyl ether to a 30 or 40% solution of polymers in a non-selective solvent is capable of precipitating the unstable polymers.

Temperature has a great influence on the selectivity of selective solvents. Solvent power increases, and its reciprocal, the precipitating power, decreases, with increasing temperature. Differences in the selectivity of various solvents decrease with increasing temperatures, with the effect that at elevated temperatures all selective solvents tend to become non-selective solvents. This indicates that fractional solvent separation should normally be carried out at the lowest practical temperature. For reasons of high viscosity of polymer solutions and because of decreasing selectivity at elevated temperatures treating temperatures are preferably held within the limits of 0° to 100° C. and below the boiling point of the solvents to avoid the necessity of having to employ superatmospheric pressures. However, superatmospheric pressure may have to be applied to maintain the liquid state as for formaldehyde.

The temperature susceptibility of polymer solutions in selective solvents enables the fractionation of polymers with a single mixture of selective solvent and polymers at various temperatures. Thus, by gradually lowering the temperature with or without adding further amounts of the solvent, more and more polymers can be precipitated, individual precipitates having progressively lower molecular weights. Or else a polymer mixture can be treated step-wise with a relatively small quantity of selective solvent at successively higher temperatures, with the effect that the lowest polymers are dissolved first, the next heavier ones dissolving at the next higher temperature.

When solutions of unstable polymers are worked in an apparatus of the type described for testing, or in a colloidal mill or the like, unstable components are broken down to stable ones. Polymers suitable for lubricants can thus be produced by simple working and without fractionation, from very large, colloidally dispersible and mechanically unstable polymers.

We claim as our invention:

1. In the process of fractionally separating a mixture of non-fluid hydrocarbon polymers of different molecular weights ranging from below 1,500 to above 150,000 of the type produced by polymerizing unsaturated hydrocarbons capable of forming polymeric homologous series by means of a polymerization catalyst of the type of boron fluoride to produce polymer fractions of relatively uniform molecular weight, the steps of dissolving said mixture in a quantity of a non-selective solvent to form a solution, subjecting said solution to repeated treatments with a series of selective oxyhydrocarbon solvents of progressively higher oxygen content possessing 20 or less carbon atoms and 2 to 10 carbon atoms per atom of oxygen, said series consisting of compounds of a single chemical class selected from the group consisting of alcohols, ketones, ethers, esters, mono-carboxy acids and phenols, each treatment being carried out under conditions to effect precipitation of polymers of relatively high molecular weights from the said solution and separating the precipitate from the solution remaining after each treatment.

2. In the process of producing lubricating oils of high stability and greatly improved viscosity index from mineral lubricating oils and a mixture of hydrocarbon polymers of the type produced by polymerizing unsaturated hydrocarbons capable of forming polymeric homologous series by means of a polymerization catalyst of the type of boron fluoride, said mixture containing polymers of molecular weights below and above 1500 and failing in the shear-viscosity breaking test as herein described, the steps of dissolving said mixture of polymers in a non-selective solvent to form a solution, treating said solution with a selective solvent under conditions to form a first precipitate consisting essentially of extremely large mechanically unstable polymers whose presence causes the said mixture to fail in the said shear viscosity breaking test, separating this first precipitate from the remaining solution, treating the remaining solution with a selective solvent under conditions to form a second precipitate of polymers having molecular weights above 1500, separating the second precipitate from the remaining solution and blending it with mineral lubricating oil.

3. In the process of producing lubricating oils of high stability and greatly improved viscosity index from mineral lubricating oils and a mixture of hydrocarbon polymers of the type produced by polymerizing unsaturated hydrocarbons capable of forming polymeric homologous series by means of a polymerization catalyst of the type of boron fluoride, said mixture containing polymers of molecular weights below and above 1500 and failing in the shear-viscosity breaking test as herein described, the steps of dissolving said mixture of polymers in a non-selective solvent to form a solution, treating said solution with a relatively small quantity of ethyl ether under conditions to form a first precipitate consisting essentially of extremely large mechanically unstable polymers whose presence causes the said mixture to fail in the said shear-viscosity breaking test, separating this first precipitate from the remaining solution, treating the remaining solution with a selective solvent under conditions to form a second precipitate of polymers having molecular weights above 1500, separating the second precipitate from the remaining solution and blending it with mineral lubricating oil.

4. In the process of fractionally separating a mixture of non-fluid hydrocarbon polymers of different molecular weights ranging from below 1,500 to above 150,000 of the type produced by polymerizing unsaturated hydrocarbons capable of forming polymeric homologous series by means of a polymerization catalyst of the type of boron fluoride to produce polymer fractions of relatively uniform molecular weight, the steps of dissolving said mixture in a non-selective solvent to form a solution, subjecting said solution to successive treatments with at least two separate aliphatic ketones of progressively higher oxygen-carbon ratio, selected from the group consisting of ethyl butyl ketone, methyl butyl ketone, ethyl propyl ketone, methyl propyl ketone, di-ethyl ketone, methyl ethyl ketone and acetone, under conditions to form in each treatment a solution and a precipitate, each successive precipitate having a lower molecular weight than the preceding, and separately separating the precipitates from the solution remaining after each treatment.

5. In the process of fractionally separating a mixture of non-fluid hydrocarbon polymers of different molecular weights ranging from below 1,500 to above 150,000 of the type produced by polymerizing unsaturated hydrocarbons capable of forming polymeric homologous series by means of a polymerization catalyst of the type of boron fluoride to produce polymer fractions of relatively uniform molecular weight, the steps of dissolving said mixture in a non-selective solvent to form a solution, subjecting said solution to successive treatments with at least two separate alcohols of progressively higher oxygen-carbon ratio, selected from the group consisting of amyl, butyl, propyl and ethyl alcohols, under conditions to form in each treatment a solution and a precipitate, each successive precipitate having a lower molecular weight than the preceding one, and separately separating the precipitates from the solution remaining after each treatment.

6. In the process of fractionally separating a mixture of non-fluid hydrocarbon polymers of different molecular weights ranging from below 1,500 to above 150,000 of the type produced by polymerizing unsaturated hydrocarbons capable of forming polymeric homologous series by means of a polymerization catalyst of the type of boron fluoride to produce polymer fractions of relatively uniform molecular weight, the steps of dissolving said mixture in a non-selective solvent to form a solution, subjecting said solution to successive treatments with at least two separate ethers of progressively higher oxygen-carbon ratio, selected from the group consisting of propyl butyl ether, di-propyl ether, ethyl propyl ether and di-ethyl ether, under conditions to form in each treatment a solution and a precipitate, each successive precipitate having a lower molecular weight than the preceding one, and separately separating the precipitates from the solution remaining after each treatment.

MARTIN DE SIMÓ.
FREDERICK B. HILMER.